US009019117B1

(12) United States Patent
Crook

(10) Patent No.: US 9,019,117 B1
(45) Date of Patent: Apr. 28, 2015

(54) HYDROGEN SULFIDE ALARM METHODS

(71) Applicant: Gary W. Crook, Midland, TX (US)

(72) Inventor: Gary W. Crook, Midland, TX (US)

( * ) Notice: Subject to any disclaimer, the term of this patent is extended or adjusted under 35 U.S.C. 154(b) by 110 days.

(21) Appl. No.: 13/631,960

(22) Filed: Sep. 29, 2012

Related U.S. Application Data

(60) Provisional application No. 61/624,903, filed on Apr. 16, 2012.

(51) Int. Cl.
*G01V 3/00* (2006.01)
*G08B 21/14* (2006.01)

(52) U.S. Cl.
CPC .................................... *G08B 21/14* (2013.01)

(58) Field of Classification Search
USPC ........................................ 340/853.1, 853.2
See application file for complete search history.

(56) References Cited

U.S. PATENT DOCUMENTS 4,157,283 A 6/1979 Zetter
5,311,197 A 5/1994 Sorden et al.
5,382,943 A 1/1995 Tanaka
5,454,918 A 10/1995 Javadi et al.
5,568,121 A 10/1996 Lamensdorf
5,650,770 A 7/1997 Schlager et al.
5,867,105 A 2/1999 Hajel
5,969,623 A 10/1999 Fleury et al.
6,079,490 A 6/2000 Newman
6,252,510 B1 6/2001 Dungan
6,404,884 B1 6/2002 Marwell et al.
6,606,897 B1 8/2003 Koyano et al.
6,670,887 B2 12/2003 Dungan
6,701,772 B2 3/2004 Kreichauf et al.
6,744,373 B2 6/2004 Koyano et al.
6,785,619 B1 8/2004 Homann et al.
6,794,991 B2 9/2004 Dungan
6,954,143 B2 10/2005 Crook
7,212,111 B2 5/2007 Tupler et al.
RE40,238 E 4/2008 Crook
7,463,160 B2 * 12/2008 Crook .......................... 340/632
2004/0056771 A1 3/2004 Dungan

* cited by examiner

*Primary Examiner* — Travis Hunnings
(74) *Attorney, Agent, or Firm* — Robert J. Harter; www.bobharter.com

(57) ABSTRACT

H2S (hydrogen sulfide) alarm methods include automated systems for creating reports, initiating different safety drills and/or recording certain calibration and bump tests. The methods being automated reduces the chance of human error and falsified records. The H2S alarm methods are particularly useful for ensuring the safety of workers at remote worksites.

9 Claims, 5 Drawing Sheets

HYDROGEN SULFIDE ALARM METHODS

CROSS REFERENCE TO RELATED APPLICATIONS

This application claims the benefit of provisional patent application Ser. No. 61/624,903 filed on Apr. 16, 2012 by the present inventor.

FIELD OF THE DISCLOSURE

The subject invention generally pertains to H2S gas alarm methods and more specifically to performing drills, tests and recording emergency responses.

BACKGROUND

In some locations, it may be important to monitor the concentration H2S (hydrogen sulfide) to alert people of hazardous levels of the gas. When the monitored area is a remote worksite, sometimes others beyond the worksite are also notified. The term, "remote," means a separation distance of at least ten miles. Examples of H2S monitoring systems are disclosed in U.S. Pat. Nos. 6,954,143; RE40,238 and 7,463,160; all of which are specifically incorporated by reference herein.

DETAILED DESCRIPTION

Figure 1:
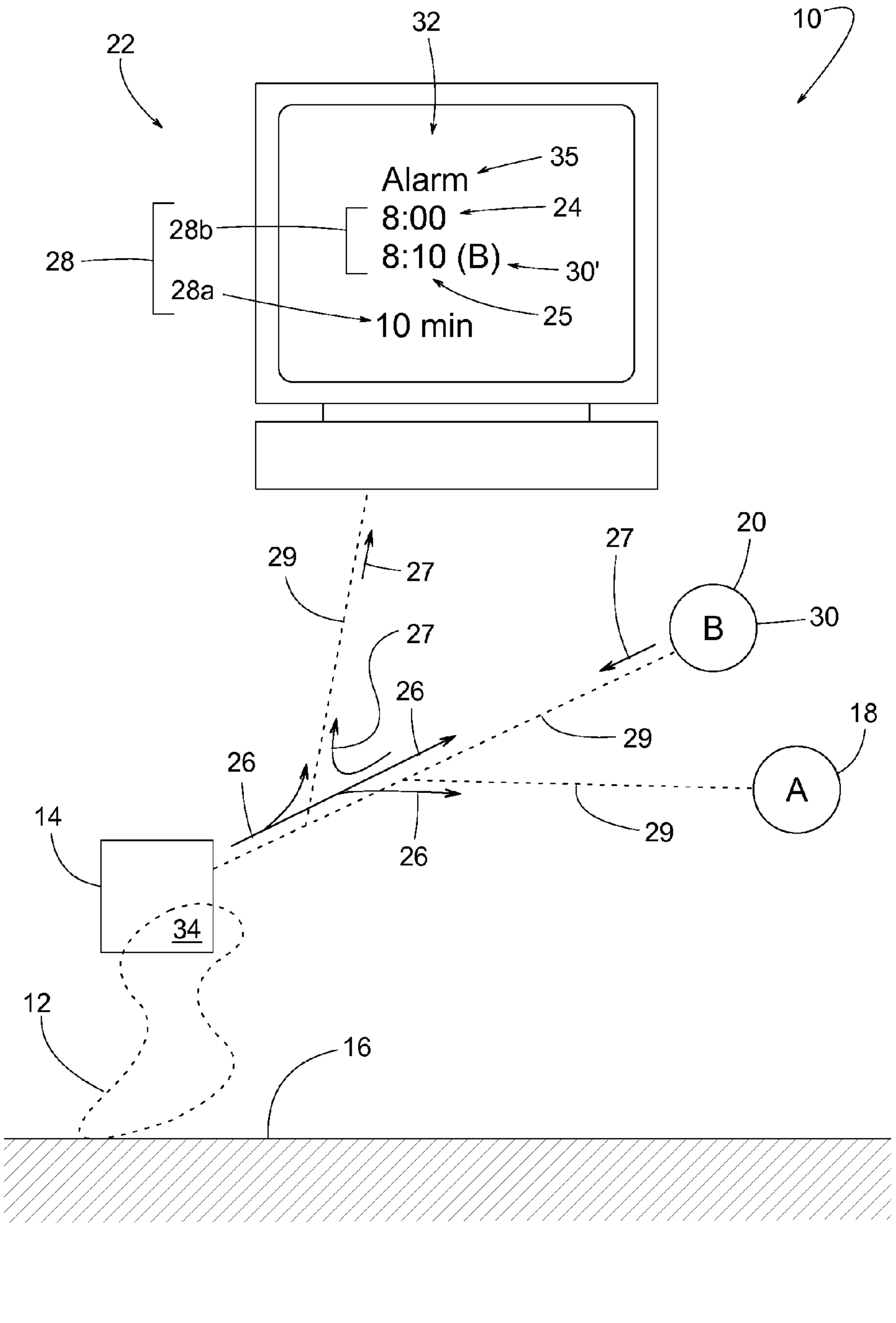
FIG. 1 is a schematic diagram of one example H2S alarm method.
Figure 2:
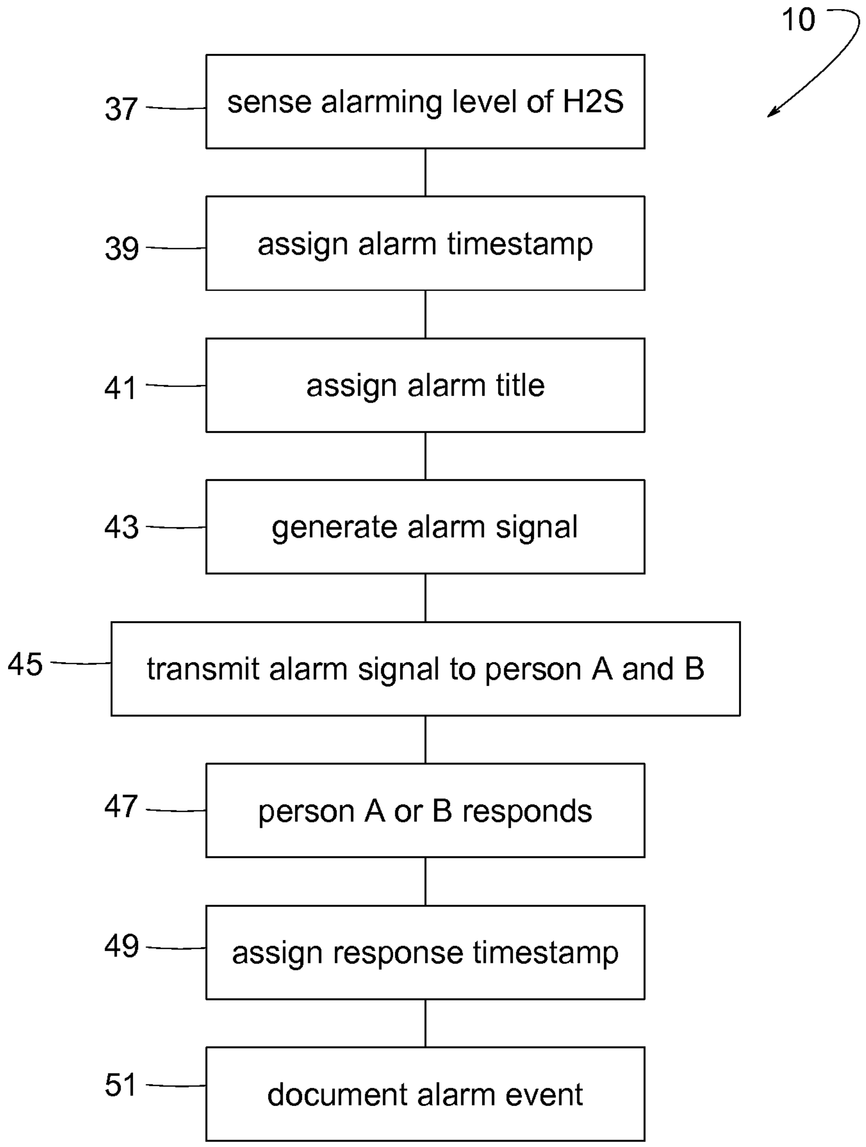
FIG. 2 is a block diagram further illustrating the H2S alarm method shown in FIG. 1.

FIGS. 1 and 2 show an example H2S alarm method 10 for a remote worksite 16 where a group of workers might experience an alarm event 34 (e.g., high concentration of H2S). In response to sensing H2S gas 12 at a concentration exceeding a predetermined threshold, an H2S monitor 14 at worksite 16 sends an alarm signal 26 to a computer system 22 and multiple potential responders, e.g., a person-A 18 and a person-B 20. To acknowledge having received alarm signal 26 and to accept responsibility for dealing with alarm event 34, person-A 18 and/or person-B 20 responds by sending a response signal 27 to computer system 22. Computer system 22 then documents alarm event 34 by creating a report 32 that, in some examples, includes an alarm title 35 and a response time 28. Alarm title 35 is any identifier providing some information related to alarm event 34, e.g., worksite location, worksite name, type or nature of the alarm event, etc.

In some examples, response time 28, as recorded in report 32, pertains to which of person-A 18 or person-B 20 was a first-to-respond person 30, i.e., the first to send response signal 27. Report 32 records first-to-respond person 30 by way of a person identifier 30' (name, code, etc.), which in the illustrated example happens to correspond to person-B 20. A slower-to-respond person (person-A 18 in this particular example) would be the one that failed to respond or responded later than the first-to-respond person.

Report 32 can document response time 28 in various ways. In some examples, for instance, response time 28 is documented in report 32 as a combination **28*b* of an alarm timestamp 24 and a response timestamp 25. Alarm timestamp 24 is the approximate time that alarm event 34 started. In some examples, alarm timestamp 24 is the time H2S monitor 14 sent out alarm signal 26. In some examples, alarm timestamp 24 is the time computer system 22 received alarm signal 26. Response timestamp 25 is the approximate time that the first-to-respond person 30 (person-A or person-B) sent out response signal 27. In some examples, response timestamp 25 is the time computer system 22 received response signal 27. In some examples, response time 28 is documented in report 32 as a difference 28*a* between alarm timestamp 24 and response timestamp 25. In the illustrated example, difference 28*a*** equals ten minutes.

Report 32 can be in various formats including, but not limited to, a single screen shot displayed on a computer screen of computer system 22, multi-page screen shots displayed on a computer screen of computer system 22, a single page printed document, a multi-page printed document, etc. In some examples, computer system 22 comprises one or more computers examples of which include, but are not limited to, a desktop computer, a laptop computer, a server, a smartphone, tablet, etc.

In some examples, H2S monitor 14 at worksite 16, a computer of computer system 22, person-A 18 and person-B 20 are all remote relative to each other. In some examples, a wireless communication system 29 (satellite, radio waves, cell towers, antennas, etc.) provides wireless communication links between two or more remote elements 14, 18, 20 and 22. The term, "wireless" means at least some portion of a communication link conveys a signal (e.g., signals 26 and 27) without wires through air.

In some examples, H2S alarm method 10 is carried out as shown in FIG. 2, wherein block 37 illustrates H2S monitor 14 sensing the alarming level of H2S 12 at worksite 16. Block 39 illustrates assigning alarm timestamp 24 to alarm event 34. Block 41 illustrates assigning alarm title 35 to alarm event 34. Block 43 illustrates H2S monitor 14 generating alarm signal 26 as a consequence of sensing the alarming level of H2S at worksite 16. Block 45 illustrates wirelessly transmitting alarm signal 26 to person-A and to person-B, wherein one of them is the first-to-respond person 30. Block 47 illustrates the first-to-respond person 30 responding to alarm signal 26. Block 49 illustrates assigning response timestamp 25 to the first-to-respond person 30, wherein, in some examples, timestamp 25 identifies a time-of-day at which the first-to-respond person 30 responded to alarm signal 26. Block 51 illustrates computer system 22 generating report 32 documenting alarm event 34, alarm title 35, response time 28, and person-identifier 30' identifying first-to-respond person 30, wherein response time 28 is the difference **28*a* between alarm timestamp 24 and response timestamp 25 and/or a display of both alarm timestamp 24 and response timestamp 25**.

Figure 3:
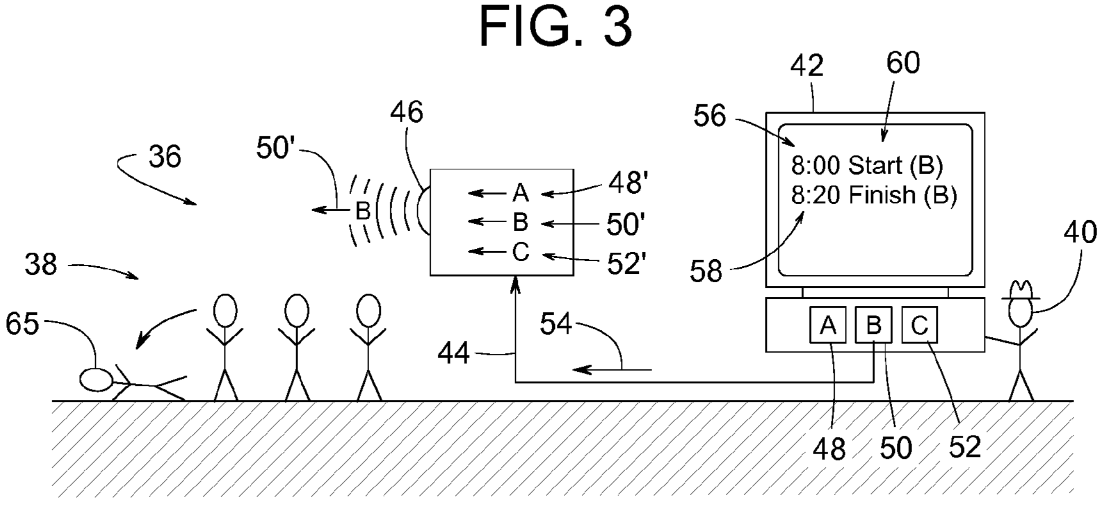
FIG. 3 is a schematic diagram of another example H2S alarm method.
Figure 4:
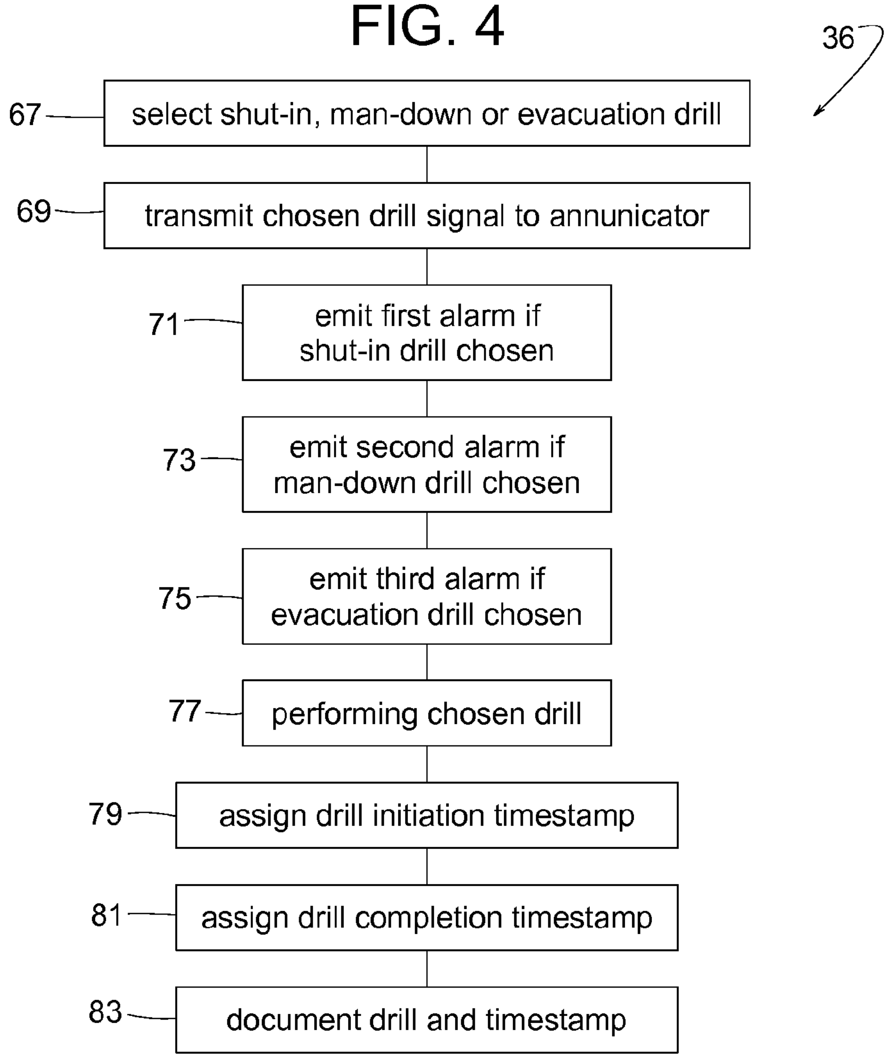
FIG. 4 is a block diagram further illustrating the H2S alarm method shown in FIG. 3.

FIGS. 3 and 4 illustrate an example H2S alarm method 36 for a group of workers 38 at risk for exposure to hazardous concentrations of H2S gas. To prepare workers 38 for various emergencies, method 36 provides means for periodically initiating various emergency response drills, and automatically generating a report 60 that documents the drills and when they were run. Examples of such drills include, but are not limited to, a shut-in drill 48, a man-down drill 50, and an evacuation drill 52.

In some examples of shut-in drill 48, a designated person 65 (e.g., some chosen member of workers 38) lies down pretending to be in distress and needing help, and other members of workers 38 respond accordingly. In some examples of shut-in drill 48, workers 38 close a plurality of fluid valves associated with worksite 16, wherein worksite 16 in this example is a well site. In some examples of evacuation drill 52, workers 38 begin leaving worksite 16.

In some examples, a coordinator 40 (e.g., supervisor, manager, or a member of workers 38) initiates a desired drill using a control system 42, which is in communication with an annunciator 46 (audible alarm) that is in the vicinity of workers 38. In some but not all examples, control system 42 and annunciator 46 are remote relative to each other, and a wireless communication link 44 connects the two. In some examples, control system 42 comprises a computer that enables coordinator 40 to select and initiate a desired drill To run man-down drill 50, for instance, coordinator 40 uses a mouse-click (or some other known input means) to select man-down drill 50. Control system 42 records the coordinator's chosen drill and the input's time of entry (drill initiation timestamp 56) and sends a chosen drill signal 54 (e.g., man-down drill 50) to annunciator 46. Annunciator 46 then emits an audible alarm 48', 50' or 52', i.e., the one corresponding to man-down drill 50. Audible alarms 48', 50' and 52' are distinguishable from each other in some way, e.g., by pitch, tone, number of beeps, duration of beep, etc. In some examples, for instance, first alarm 48' is one beep, second alarm 50' is two beeps and third alarm 52' is three beeps. The number of beeps, in this example, tells the group of workers 38 which drill to perform. When coordinator 40 observes or otherwise becomes aware that workers 38 have completed the chosen drill, coordinator 40 uses control system 42 to record a drill completion timestamp 58. Control system 42 then generates report 60 documenting the chosen drill, initiation timestamp 56 and completion timestamp 58.

In some examples, H2S alarm method 36 is carried out as shown in FIG. 4, wherein block 67 illustrates coordinator 40 using control system 42 for selecting one of three safety drills comprising a shut-in drill, a man-down drill and an evacuation drill. Block 69 illustrates transmitting a chosen drill signal from control system 42 to annunciator 46, wherein the chosen drill signal identifies which of the three safety drills coordinator 40 selected. Block 71 illustrates in response to the chosen drill signal, annunciator 46 emitting first audible alarm 48' if coordinator 40 selected the shut-in drill. Block 73 illustrates in response to the chosen drill signal, annunciator 46 emitting second audible alarm 50' if coordinator 40 selected the man-down drill. Block 75 illustrates in response to the chosen drill signal, annunciator 46 emitting third audible alarm 52' if coordinator 40 selected the evacuation drill, wherein the first audible alarm, the second audible alarm and the third audible alarm are distinguishable from each other. Block 77 illustrates in response to annunciator 46 emitting at least one of the first audible alarm, the second audible alarm and the third audible alarm, the group of workers 38 performing and completing a chosen drill associated with the chosen drill signal 54. Block 79 illustrates assigning drill initiation timestamp 56 to the chosen drill. Block 81 illustrates assigning drill completion timestamp 58 to the chosen drill. Block 83 illustrates control system 42 generating report 60 documenting the chosen drill and further documenting drill initiation timestamp 56 and/or drill completion timestamp 58.

Figure 5:
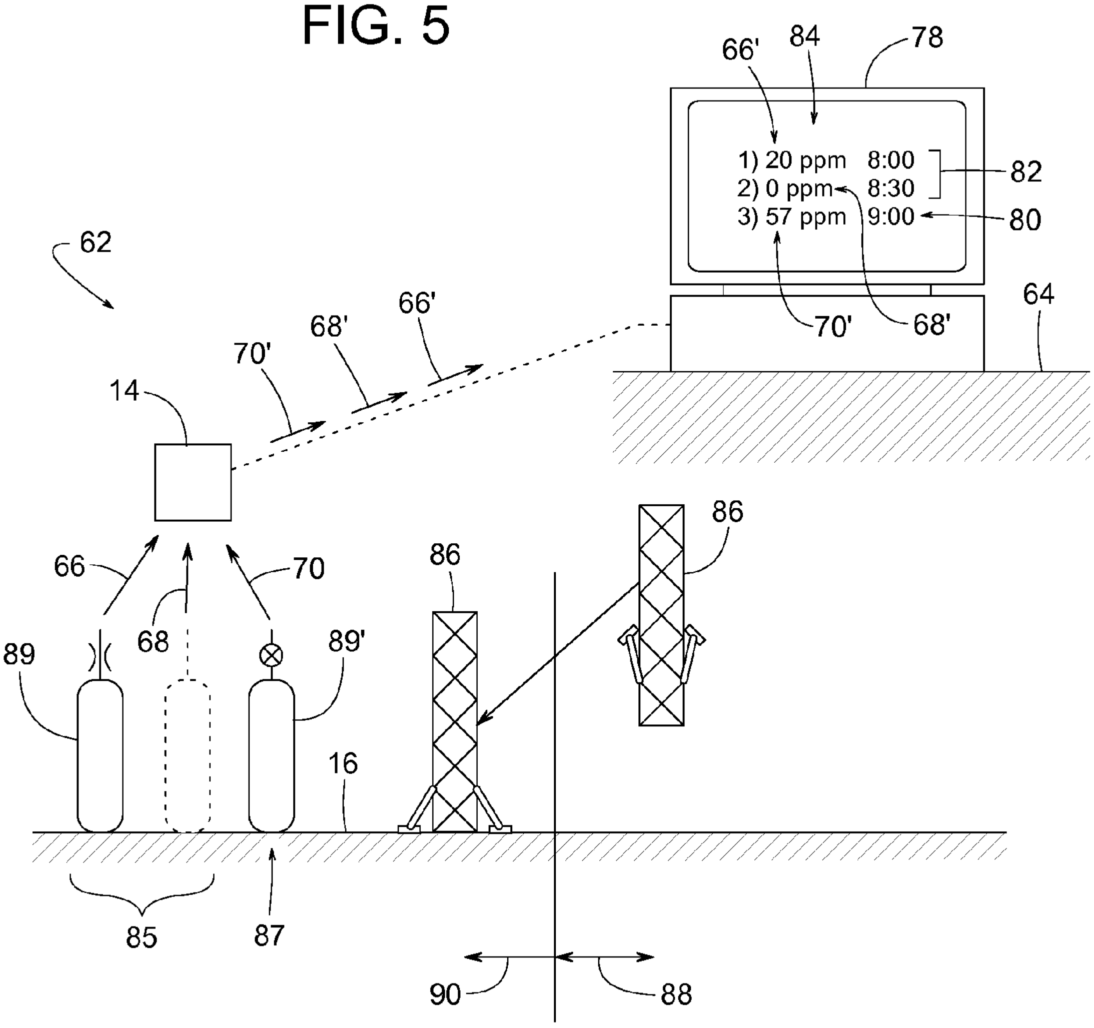
FIG. 5 is a schematic diagram of another example H2S alarm method.
Figure 6:
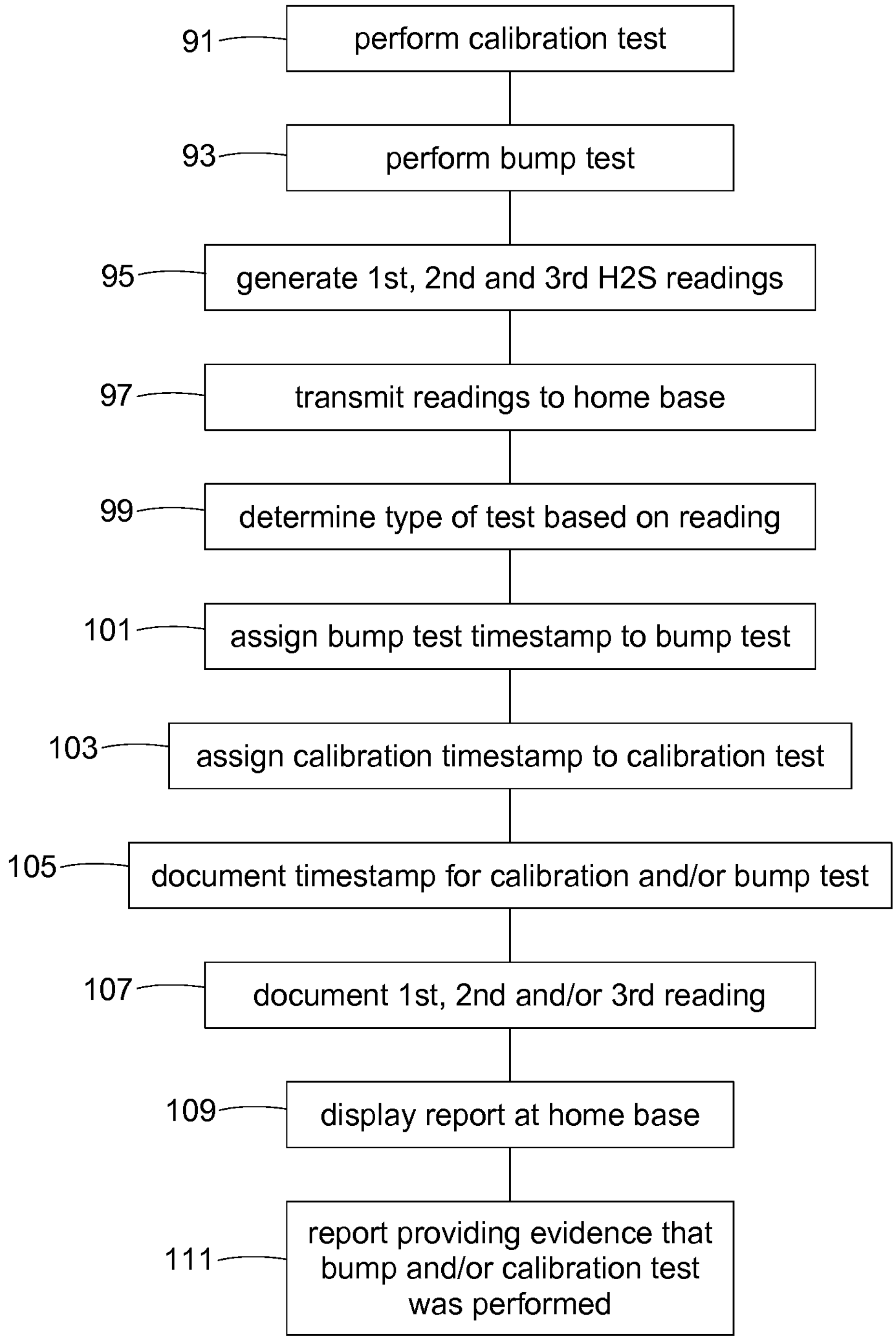
FIG. 6 is a block diagram further illustrating the H2S alarm method shown in FIG. 5.

FIGS. 5 and 6 illustrate an example H2S alarm method 62 for automatically distinguishing and documenting various H2S related tests, such as a calibration test 85 and a bump test 87. In some examples, calibration test 85 involves using a pressurized canister 89 of H2S gas to expose H2S monitor 14 with a predetermined first concentration of H2S gas 66, such as a concentration of 20 ppm, and at another time exposing H2S monitor 14 to a second concentration of H2S gas 68 of substantially zero ppm. The resulting response of H2S monitor 14 is then noted or adjusted accordingly.

Bump test 87, in some examples, involves using a canister 89' to expose H2S monitor 14 with a third concentration of H2S gas 70 that is appreciably greater in concentration than the predetermined first concentration 66. In the illustrated example, the third concentration of H2S gas 70 is 57 ppm. Calibration test 85 is used for establishing the accuracy of H2S monitor 14, and bump test 87 provides a simple means for determining whether H2S monitor 14 is even functional.

In some examples, method 62 ensures that calibration test 85 is performed and documented during an equipment setup period 88, prior to an operational period 90 of well bore equipment 86. Well bore equipment 86 is machinery used in the drilling or servicing of a well bore. Examples of well bore equipment 86 include, but are not limited to, a derrick, drilling rig, workover rig, etc.

One example operational sequence of H2S alarm method 62 is as follows. A work crew during setup period 88 sets up equipment 86 at worksite 16 (e.g., a well bore). Prior to fully operating equipment 86 during operational period 90, calibration test 85 is run. H2S monitor 14 is exposed sequentially to H2S gas concentrations 66 and 68 (or in reverse order), and the monitor's resulting first and second readings 66' and 68', respectively, are wirelessly transmitted to a computer system 78 at a remote home base 64. Computer system 78 generates a report 84 documenting readings 66' and 68' and assigns them a calibration timestamp 82. If readings 66' and 68' indicate that H2S monitor 14 is properly calibrated and functional, equipment 86 is cleared for use during operational period 90.

To ensure H2S monitor 14 remains functional, bump test 87 is performed periodically during operational period 90. In the illustrated example, H2S monitor 14 is exposed to H2S gas concentration 70, and the monitor's resulting third reading 70' is wirelessly transmitted to computer system 78. Through report 84, computer system 78 documents reading 70' and assigns it a bump test timestamp 80.

Based on the values of readings 66', 68' and 70', computer system 78 determines whether a particular reading is from calibration test 85 or from bump test 87. In some examples, computer system 78 determines a reading is from calibration test 85 if the reading is within a first predetermined range (e.g., within 5 ppm, or between 0 and 25 ppm, etc.) of the monitor's predetermined threshold (e.g., 20 ppm). Examples of said first predetermined range include, but are not limited to, within 5 ppm of 20 ppm, within 0 to 25 ppm, etc. The predetermined threshold is the chosen value at which H2S monitor 14 emits an alarm. In some examples, computer system 78 determines a reading is from calibration test 85 if the reading is within a second predetermined range of zero (e.g., within 5 ppm of zero ppm) and/or has a timestamp indicating a predetermined time span between readings 66' and 68'. In some examples, computer system 78 determines a reading is from bump test 87 if the reading is of a predetermined limited duration and exceeds the predetermined threshold (e.g., 20 ppm) by at least a predetermined amount (e.g., by at least 15 ppm more than the predetermined threshold).

In some examples, H2S alarm method 62 is carried out as shown in FIG. 6, wherein block 91 illustrates performing a calibration test on H2S monitor 14, wherein the calibration test involves during a first period exposing H2S monitor 14 to a first concentration of H2S that is within a first predetermined range of a predetermined threshold of the H2S monitor, the calibration test also involves during a second period exposing H2S monitor 14 to a second concentration of H2S that is within a second predetermined range of zero. Block 93 illustrates performing a bump test on H2S monitor 14, wherein the bump test involves during a third period exposing H2S monitor 14 to a third concentration of H2S gas that exceeds the predetermined threshold by at least a predetermined amount. Block 95 illustrates H2S monitor 14 generating first reading 66', second reading 68' and third reading 70' corresponding respectively to the first concentration of H2S gas 66, the second concentration of H2S gas 68, and the third concentration of H2S gas 70. Block 97 illustrates transmitting first reading 66', second reading 68' and third reading 70' from H2S monitor 14 to home base 64. Block 99 illustrates based on readings 66', 68' and/or 70', determining whether a performed test was calibration test 85 or the bump test 87. Block 101 illustrates computer system 78 assigning bump test timestamp 80 to the bump test. Block 103 illustrates computer system 78 assigning calibration timestamp 82 to the calibration test. Block 105 illustrates computer system 78 generating report 84 documenting bump test timestamp 80 and/or calibration timestamp 82. Block 107 illustrates computer system 78 documenting via report 84 at least one of readings 66', 68' and 70'. Block 109 illustrates computer system 78 displaying report 84 at home base 64. Block 111 illustrates based on at least one of readings 66', 68' and 70'; report 84 providing evidence indicating whether the bump test or the calibration test was performed.

Additional points worth noting include the following: A group of workers is any group of people. In some examples, a group of workers includes the coordinator. In some examples, a timestamp includes the time of day and the date. In some examples, an H2S monitor includes an H2S sensor. A single page means a single sheet or a single screenshot on a computer. The term, "significantly exceeds" means at least 50% greater than a certain value or threshold. The term, "substantially equal to the threshold" means a value or reading that is within 20% of the threshold. A report can be a single page, a single screenshot, multiple pages, or multiple screenshots.

Although the invention is described with respect to a preferred embodiment, modifications thereto will be apparent to those of ordinary skill in the art. The scope of the invention, therefore, is to be determined by reference to the following claims:

The invention claimed is:

1. An H2S alarm method involving a group of workers, a coordinator and a control system, wherein the control system is connected in communication with an annunciator, the H2S alarm method comprising:

the coordinator using the control system for selecting one of three safety drills comprising a shut-in drill, a man-down drill and an evacuation drill;

transmitting a chosen drill signal from the control system to the annunciator, wherein the chosen drill signal identifies which of the three safety drills the coordinator selected;

in response to the chosen drill signal, the annunciator emitting a first audible alarm if the coordinator selected the shut-in drill;

in response to the chosen drill signal, the annunciator emitting a second audible alarm if the coordinator selected the man-down drill;

in response to the chosen drill signal, the annunciator emitting a third audible alarm if the coordinator selected the evacuation drill, the first audible alarm, the second audible alarm and the third audible alarm being distinguishable from each other;

in response to the annunciator emitting at least one of the first audible alarm, the second audible alarm and the third audible alarm, the group of workers performing and completing a chosen drill associated with the chosen drill signal;

assigning a drill initiation timestamp to the chosen drill;

assigning a drill completion timestamp to the chosen drill; and the control system generating a report documenting the chosen drill and further documenting at least one of the drill initiation timestamp and the drill completion timestamp.

2. The H2S alarm method of claim 1, wherein the group of workers includes the coordinator.

3. The H2S alarm method of claim 1, wherein the control system is connected in wireless communication with the annunciator.

4. The H2S alarm method of claim 1, wherein the control system documents the drill completion timestamp.

5. The H2S alarm method of claim 1, wherein the control system documents the drill initiation timestamp.

6. The H2S alarm method of claim 1, wherein the control system documents both the drill initiation timestamp and the drill completion timestamp.

7. The H2S alarm method of claim 1, wherein the chosen drill is associated with the man-down drill, and the man-down drill involves a designated person lying down, wherein the group of workers includes the designated person.

8. The H2S alarm method of claim 1, wherein the chosen drill is associated with the shut-in drill, and the shut-in drill involves.

9. The H2S alarm method of claim 1, wherein the chosen drill is associated with the evacuation drill, and the evacuation drill involves.

* * * * *